(12) United States Patent
Koyanagi et al.

(10) Patent No.: US 8,768,226 B2
(45) Date of Patent: Jul. 1, 2014

(54) DEVELOPER SUPPORT MEMBER, ELECTROPHOTOGRAPHIC PROCESS CARTRIDGE AND ELECTROPHOTOGRAPHIC IMAGE FORMING APPARATUS

(71) Applicant: Canon Kabushiki Kaisha, Tokyo (JP)

(72) Inventors: Takashi Koyanagi, Mishima (JP); Masaki Yamada, Mishima (JP); Kunimasa Kawamura, Mishima (JP); Yuji Sakurai, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 13/646,441

(22) Filed: Oct. 5, 2012

(65) Prior Publication Data

US 2013/0028634 A1  Jan. 31, 2013

Related U.S. Application Data

(63) Continuation of application No. PCT/JP2012/003167, filed on May 15, 2012.

(30) Foreign Application Priority Data

Jul. 15, 2011 (JP) .................... 2011-156960

(51) Int. Cl.
*G03G 15/08* (2006.01)

(52) U.S. Cl.
USPC ........................................... 399/286

(58) Field of Classification Search
USPC ......... 399/107, 110, 111, 119, 252, 265, 279, 399/286; 492/48, 53, 56
See application file for complete search history.

(56) References Cited

U.S. PATENT DOCUMENTS

| | | | |
|---|---|---|---|
| 6,586,149 B2 | 7/2003 | Kawamura et al. | |
| 6,636,715 B2 | 10/2003 | Kawamura et al. | |
| 6,725,002 B2 | 4/2004 | Sakurai et al. | |
| 7,060,406 B2 | 6/2006 | Kawamura et al. | |
| 7,201,967 B2 | 4/2007 | Sakurai et al. | |
| 7,797,833 B2 * | 9/2010 | Nakamura et al. | ......... 29/895.32 |
| 7,798,948 B2 | 9/2010 | Kawamura et al. | |
| 7,799,398 B2 | 9/2010 | Nakamura et al. | |
| 7,881,646 B2 | 2/2011 | Nakamura et al. | |
| 7,979,004 B2 | 7/2011 | Tanaka et al. | |
| 8,176,632 B2 | 5/2012 | Kawamura et al. | |
| 8,182,405 B2 | 5/2012 | Kurachi et al. | |
| 2012/0091608 A1 | 4/2012 | Kawamura et al. | |
| 2012/0195631 A1 | 8/2012 | Yamada et al. | |
| 2012/0195649 A1 | 8/2012 | Kawamura et al. | |
| 2013/0004211 A1 | 1/2013 | Ishii et al. | |

FOREIGN PATENT DOCUMENTS

| | | |
|---|---|---|
| JP | 57-5047 A | 1/1982 |
| JP | 2005-141192 A | 6/2005 |
| JP | 2007-127777 A | 5/2007 |
| JP | 2007-133113 A | 5/2007 |
| JP | 2008-164915 A | 7/2008 |
| JP | 2009-109861 A | 5/2009 |
| JP | 2009-116009 A | 5/2009 |
| JP | 2010-24319 A | 2/2010 |
| JP | 2010-107968 A | 5/2010 |
| JP | 2010-152328 A | 7/2010 |
| JP | 2011-69936 A | 4/2011 |

OTHER PUBLICATIONS

International Preliminary Report on Patentability, International Application No. PCT/JP2012/003167, Mailing Date Jan. 30, 2014.
International Search Report dated Jun. 26, 2012 in International Application No. PCT/JP2012/003167.

* cited by examiner

*Primary Examiner* — Hoan Tran
(74) *Attorney, Agent, or Firm* — Fitzpatrick, Cella, Harper and Scinto

(57) ABSTRACT

A developing roller which is excellent in image quality and image durability and stably outputs a uniform image, and a process cartridge and an electrophotographic apparatus using the developing roller are provided. The developing roller has a mandrel, an elastic layer and a surface layer covering the elastic layer surface, wherein the surface layer contains a urethane resin having at least one structure of the followings A) and B) between two adjacent urethane linkages: A) a structure represented by the following structural formula (1), and at least one structure selected from the group consisting of structures represented by the following structural formulae (2) and (3), and B) a structure represented by the following structural formula (4), and the surface layer contains polyurethane resin particles of which the elastic part of the indentation work based on ISO 14577-1 is 80% or more, is obtained:

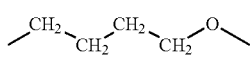
(1)

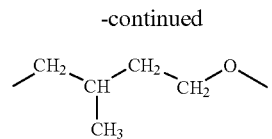
(2)

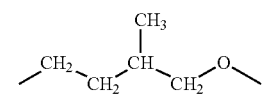
(3)

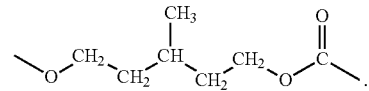
(4)

4 Claims, 3 Drawing Sheets

DEVELOPER SUPPORT MEMBER, ELECTROPHOTOGRAPHIC PROCESS CARTRIDGE AND ELECTROPHOTOGRAPHIC IMAGE FORMING APPARATUS

CROSS-REFERENCE TO RELATED APPLICATIONS

This application is a continuation of International Application No. PCT/JP2012/003167, filed May 15, 2012, which claims the benefit of Japanese Patent Application No. 2011-156960, filed Jul. 15, 2011.

BACKGROUND OF THE INVENTION

1. Field of the Invention

The present invention relates to a developer support member and an electrophotographic process cartridge for use in an electrophotographic image forming apparatus, as well as an electrophotographic image forming apparatus.

2. Description of the Related Art

In an electrophotographic image forming apparatus, a photosensitive member (drum) is charged by a charging unit, and an electrostatic latent image is formed on the drum by laser. Then, a developer (toner) in a developing container is conveyed by a developer support member, and the electrostatic latent image on the drum is developed by the toner at the portion of the drum to which the developer support member is close. Thereafter, the toner on the drum is transferred to recording paper by a transfer unit, and fixed by heat and pressure. One developer support member for use in such a developing method includes a developer support member in which an elastic layer is provided around a metallic core member and, if necessary, a single surface layer or a plurality of surface layers is/are formed on the elastic layer.

Recently, there has been a demand for higher reproducibility and uniformity of an output image, and in particular, there has been a demand for a developer support member having a highly stabilized toner conveying property. Therefore, there is a need for a developer support member having a toner conveying ability not impaired even after the member is left to stand for a long period under various environments.

In particular, tackiness on a surface of a developer support member may be increased under a high-temperature and high-humidity environment. In this case, a toner in contact with the surface of a developer support member is fixed to the surface to thereby make the toner conveying ability of the developer support member ununiform, thereby sometimes causing defects in an electrophotographic image to be finally formed.

Japanese Patent Application Laid-Open No. 2005-141192 has reported a method for suppressing adverse effects under each temperature and humidity environment by incorporating a polytetramethylene glycol-based polyurethane having a specified composition into a roller surface.

Japanese Patent Application Laid-Open No. 2009-116009 has reported a countermeasure method for suppressing change in surface roughness due to a long period of use of a roller having a surface layer containing flexible polyurethane resin particles.

SUMMARY OF THE INVENTION

The surface of a developer support member may have polymeric resin particles added in order to stabilize toner conveying property. The developer support member is usually under pressure from a regulating member (regulating blade) for uniformly conveying a toner. Therefore, an external force applied from the regulating blade deforms the resin particles on the surface of the developer support member positioned on the abutting portion against the regulating blade, and the surface roughness of the developer support member on the abutting portion of the developer support member against the regulating blade is reduced from a predetermined value, thereby sometimes impairing quality of an electrophotographic image.

Japanese Patent Application Laid-Open No. 2005-141192 has reported a method for suppressing adverse effects under each temperature and humidity environment. However, use of the polyurethane resin disclosed in Japanese Patent Application Laid-Open No. 2005-141192 is not sufficient to address a topical reduction in roller surface roughness due to the deformation of the resin particles on the abutting portion against the regulating blade, and thus a uniform image cannot be sometimes output after left to stand for a long period. In addition, use of the polyurethane resin particles disclosed in Japanese Patent Application Laid-Open No. 2009-116009 also cannot possibly suppress adverse effects under each temperature and humidity environment, and in particular, cannot sufficiently improve a topical reduction in roller surface roughness.

The present invention is directed to providing a developer support member for stably outputting a uniform image even in the case of being left to stand under a severe high-temperature and high-humidity environment for a long period.

The present invention is directed to providing an electrophotographic process cartridge and an electrophotographic image forming apparatus which can stably form a high quality electrophotographic image.

Solution to Problem

The present inventors have intensively studied and reviewed in order to provide a developing roller which achieves the above objects, thereby leading to the present invention.

Namely, according to one aspect of the present invention, there is provided a developing roller having a mandrel, an elastic layer and a surface layer covering the surface of the elastic layer, wherein the surface layer contains a urethane resin which has at least one structure of the followings A) and B) between two adjacent urethane linkages: A) a structure represented by the following structural formula (1), and at least one structure selected from the group consisting of a structure represented by the following structural formula (2) and a structure represented by the following structural formula (3), and B) a structure represented by the following structural formula (4), and the surface layer contains polyurethane resin particles of which the elastic part of the indentation work based on ISO 14577-1 is 80% or more, is obtained:

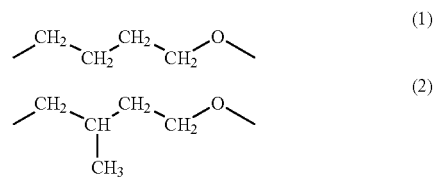

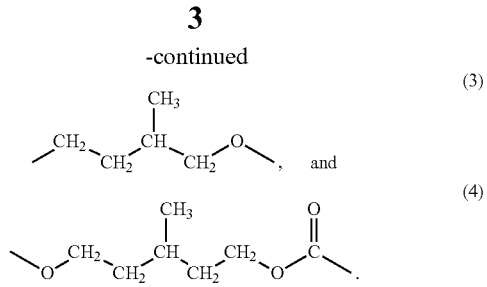

According to another aspect of the present invention, there is provided an electrophotographic process cartridge in which the developing roller is mounted as a developing member, provided with a drum on which an electrostatic latent image is to be formed and a developing member for developing the electrostatic latent image on the drum, and being mountable to and removable from a main body of an electrophotographic image forming apparatus, is obtained.

According to further aspect of the present invention, there is provided an electrophotographic image forming apparatus provided with a drum on which an electrostatic latent image is to be formed and a developing member for developing the electrostatic latent image on the drum, wherein the developing member is the above developing roller, is obtained.

The developing roller according to the present invention can stably output a uniform image even after being left to stand for a long period under a severe high-temperature and high-humidity environment. In addition, the developing roller according to the present invention can be used to obtain a high quality electrophotographic process cartridge and electrophotographic image forming apparatus.

DESCRIPTION OF THE EMBODIMENTS

Figure 1:
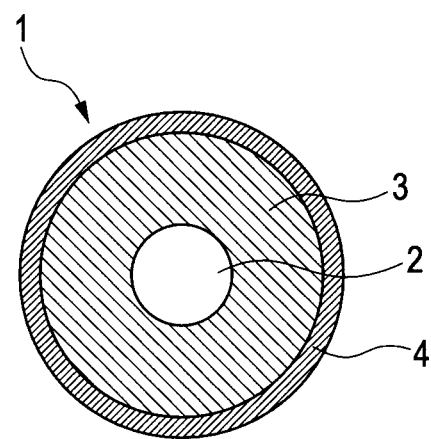
FIG. 1 is a conceptual view illustrating one example of a developing roller of the present invention.

The developing roller of the present invention has a configuration in which an elastic layer 3 is provided on the outer periphery of a mandrel 2 and the surface of the elastic layer 3 is covered with a surface layer 4, as illustrated in FIG. 1.

<Mandrel>

The mandrel 2 serves as an electrode and a supporting member, and is made of a metal or an alloy, such as aluminum, a copper alloy and stainless steel; iron subjected to a plating treatment with chromium or nickel; or a conductive material such as a synthetic resin having conductivity. The outside diameter of the mandrel 2 is usually within a range from 4 to 10 mm.

<Elastic Layer>

The elastic layer 3 provides for the developing roller such hardness and elasticity as to be pressed against a drum by means of an appropriate nip width and nip pressure so that a right amount of a toner is supplied to an electrostatic latent image formed on the surface of the drum. The elastic layer is usually formed from a molded article of a rubber material. As the rubber material, various rubber materials which have been conventionally used for a conductive rubber roller can be used. As a rubber for use in the rubber material, specifically, rubber materials such as an ethylene-propylene-diene copolymer rubber (EPDM), an acrylonitrile-butadiene rubber (NBR), a chloroprene rubber (CR), a natural rubber (NR), an isoprene rubber (IR), a styrene-butadiene rubber (SBR), a fluoro-rubber, a silicone rubber, an epichlorohydrin rubber, a hydrogenated product of NBR, a polysulfide rubber and a urethane rubber can be used singly, or two or more of these rubbers can be mixed for use. Among them, a silicone rubber can be used from the viewpoint of stability against deformation such as setting performance and the like. A silicone rubber includes polydimethylsiloxane, polymethyltrifluoropropylsiloxane, polymethylvinylsiloxane, polyphenylvinylsiloxane, and a copolymer of the above polysiloxanes.

The thickness of the elastic layer 3 is preferably within a range from 1.0 to 8.0 mm, and more preferably within a range from 2.0 to 5.0 mm.

The elastic layer 3 may be formed from a plurality of layers, an intermediate layer may also be provided between the mandrel 2 and the elastic layer 3 and between the elastic layer 3 and the surface layer 4, and one or more of other resin layer and a protective layer may also be laminated on the outer circumference of the surface layer 4.

Various additives such as a conductivity imparting agent, a non-conductive filler, a crosslinking agent and a catalyst are appropriately compounded to the elastic layer 3. As the conductivity imparting agent, carbon black; conductive metals such as aluminum and copper; and conductive metal oxides such as zinc oxide, tin oxide and titanium oxide can be used in the form of fine particles. Among them, carbon black can be particularly used because of imparting favorable conductivity even in a relatively low addition amount. In the case where carbon black is used as the conductivity imparting agent, carbon black can be compounded in an amount of 10 to 80 parts by mass based on 100 parts by mass of the rubber in the rubber material. The non-conductive filler includes silica, quartz powder, titanium oxide, zinc oxide and calcium carbonate. The crosslinking agent includes di-t-butyl peroxide, 2,5-dimethyl-2,5-di(t-butylperoxy)hexane and dicumyl peroxide. The catalyst includes a platinum catalyst, a rhodium catalyst, and a palladium catalyst, and can be particularly a platinum catalyst.

<Surface Layer>

In the surface layer 4, polyurethane resin particles are dispersed in a polyurethane resin forming a matrix.

The polyurethane resin forming a matrix contains a urethane resin having at least one structure of the followings A) and B) between two adjacent urethane linkages:

A) a structure represented by the following structural formula (1), and at least one structure selected from the group consisting of a structure represented by the following structural formula (2) and a structure represented by the following structural formula (3), and B) a structure represented by the following structural formula (4):

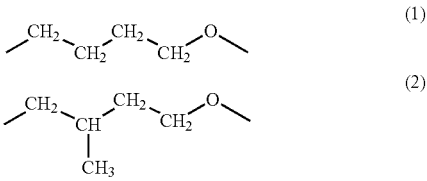

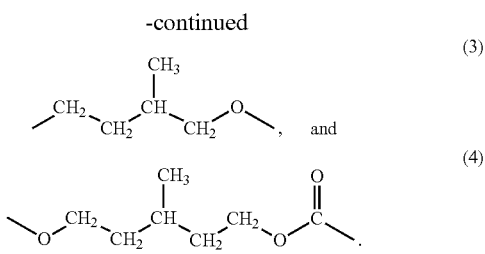

(3) and (4)

<Polyurethane Resin Particle>

In the polyurethane resin particles according to the present invention, the elastic part of the indentation work based on ISO 14577-1 is 80% or more.

In order to stabilize toner conveying property, fine particles of the polyurethane resin as the polymeric resin particles are added to the surface layer according to the present invention. The polyurethane resin particles exhibit a higher flexibility even in a low temperature region than other polymeric resin particles. Therefore, the polyurethane resin particles are suitable in terms of obtaining a developing roller stably having uniform toner conveying performance regardless of environment. In addition, crosslinked polyurethane resin particles are excellent in terms of preparing a stable coating material because of being hardly affected by a solvent and hardly swelling. The volume average particle diameter of the polyurethane resin particles can be 3 to 20 μm. The volume average particle diameter of the polyurethane resin particles in the present invention can be measured by using a laser diffraction particle size distribution measuring apparatus [for example, LA-750 {produced by Horiba, Ltd.}], or a light scattering particle size distribution measuring apparatus [for example, ELS-8000 {produced by Otsuka Electronics Co., Ltd.}]. The amount of the particles added to the surface layer can be 1 to 150 parts by mass based on 100 parts by mass of a resin solid content in the surface layer. The polyurethane resin particles can be used singly or in a combination of two or more thereof.

In the polyurethane resin particles for use in the present invention, the elastic part of the indentation work based on ISO 14577-1 is 80% or more, and can be 85% or more. Since the developer support member is usually under pressure of a regulating blade abutting to the developing support member, it is considered that in the case where resin particles are added to the surface layer, an external force applied from the regulating blade deforms the resin particles on the surface of the developer support member positioned on the abutting portion against the regulating blade.

However, in the case where the polyurethane resin particles, of which the elastic part of the indentation work is 80% or more, are used as the resin particles in the surface layer, the polyurethane resin particles, even if having been pressed by the regulating blade and having compression-deformed, are easily restored to the original shape after the pressing by the regulating blade is released.

Therefore, the difference between the surface roughness on the surface not abutting to the regulating blade and the surface roughness on the surface having abutted to the regulating blade, of the developer support member, hardly occurs, and the differences in terms of toner conveying performance and charge imparting property to a toner also hardly occur.

In contrast, in the case where polyurethane resin particles, of which the elastic part of the indentation work is less than 80%, are used as the resin particles in the surface layer, the resin particles, if having been pressed over a long period and once having compression-deformed, are not easily restored to the original shape even after the pressing by the regulating blade is released. Therefore, the surface roughness on the surface having abutted to the regulating blade, of the developer support member, may be deteriorated as compared with the surface roughness on the circumstance. Namely, the surface roughness on the site not abutting to the regulating blade and the surface roughness on the site having abutted to the regulating blade are significantly different from each other, thereby causing variations in toner conveying performance and friction charge imparting performance to a toner.

Generally, polyurethane resin particles can exhibit a high flexibility even in a lower temperature region when having a lower Tg, and therefore, polyurethane resin particles having a low Tg can be selected in the present invention.

As a method for obtaining the polyurethane resin particles having a low Tg, a method has been reported in which when polyurethane resin particles are synthesized, a polyether polyol or a polyester polyol is used as a polyol component (Japanese Patent Application Laid-Open No. 2010-24319).

As the polyurethane resin particles according to the present invention, polyurethane resin particles having the above characteristics can be selected from commercially available products and can be used. Specific examples include the followings.

"Art Pearl P-800T" (trade name, produced by Negami Chemical Industrial Co., Ltd.)

"Art Pearl JB-800T" (trade name, produced by Negami Chemical Industrial Co., Ltd.)

"DAIMICBEAZ UCN-5070D" (trade name, produced by Dainichiseika Color & Chemicals Mfg. Co., Ltd.)

"DAIMICBEAZ UCN-5150D" (trade name, produced by Dainichiseika Color & Chemicals Mfg. Co., Ltd.)

The polyurethane resin particles according to the present invention can also be produced by referring to any known method for producing polyurethane resin particles.

Herein, one principle for obtaining the polyurethane resin particles of which the elastic part of the indentation work based on ISO 14577-1 is 80% or more includes a principle in which the temperature at the maximum loss tangent (tan δ) of the polyurethane resin particles (hereinafter, this temperature is referred to as glass transition temperature (Tg)) is made as low as possible. For this purpose, as raw materials of the polyurethane resin particles, polyols having a number average molecular weight of about 6000 (trade name: Kuraray Polyol P-6010, produced by Kuraray Co., Ltd.) such as polyols for use in synthesizing polyurethane resin particles C-7 and C-8 described later are effectively used.

Other principle includes a principle in which the value in the loss elastic modulus term, tan δ of the polyurethane resin particles, is made smaller. For this purpose, as raw materials of the polyurethane resin particles, tri- or more-functional polyols (trade name: Placcel 320, produced by Daicel Corporation) such as polyols for use in synthesizing polyurethane resin particles C-5 described later are effectively used.

<Polyurethane Resin as Matrix Polymer>

The polyurethane resin for use as a matrix polymer of the surface layer according to the present invention is a urethane resin having at least one structure of the followings A) and B) between two adjacent urethane linkages: A) the structure represented by the structural formula (1), and at least one structure selected from the group consisting of the structure represented by the structural formula (2) and the structure represented by the structural formula (3), and B) the structure represented by the structural formula (4).

More specifically, the polyurethane resin according to the present invention has the following structure between two adjacent urethane linkages: (i) the structures represented by the above structural formulas (1) and (2), (ii) the structures represented by the above structural formulas (1) and (3), (iii) the structures represented by the above structural formulas (1), (2) and formula (3), (iv) the structures represented by the above structural formulas (1), (2) and (4), (v) the structures represented by the above structural formulas (1), (3) and (4), or (vi) the structures represented by the above structural formulas (1), (2), (3) and (4).

The polyurethane resin having such structures has a much lower polarity than the conventional polyurethane resin because of having a methyl group introduced into the side chain. Therefore, remarkable rise in tackiness of the roller surface can be suppressed even under a severe high-temperature and high-humidity environment (for example, temperature: 40° C., relative humidity: 95% RH), and deterioration in toner conveying property due to the extraordinary surface roughness caused by toner fixation can be prevented.

The methyl group introduced into the side chain of the polyurethane resin reduces regularity of orientation in the polyurethane resin, thereby remarkably reducing crystallinity particularly under a low-temperature environment. Therefore, the developer support member provided with the surface layer containing such a polyurethane resin is flexible even under a low-temperature environment, for example, at a temperature of 0° C., and hardly increases hardness. As a result, the shape of the polyurethane resin particles in the above surface layer is hardly prevented from being stored after the pressing by the regulating blade is released.

The polyurethane according to the present invention, which has in the molecule the structures represented by the structural formula (2) to formula (4) having a higher hydrophobicity than the structure represented by the structural formula (1), can reduce affinity between the urethane resin itself and water and make the urethane resin relatively low in water absorption. In a high temperature region, the methyl group present as the side chain in the structures represented by the structural formula (2), structural formula (3) and structural formula (4) suppresses molecular mobility in a high temperature region. Therefore, the surface of the developing roller according to the present invention hardly has an increased tackiness even under a high-temperature and high-humidity environment to thereby effectively enable suppressing toner fixation to the surface of the developing roller under a high-temperature and high-humidity environment.

In contrast, a developer support member formed by using a common polyurethane resin as a matrix polymer has an increased tackiness on the surface after being left to stand for a long period under a high-temperature and high-humidity environment, thereby easily allowing a toner to be fixed to the surface of the developer support member. As a result, the developer support member has an unstable toner conveying property, thereby sometimes failing to obtain a high quality electrophotographic image.

In the present invention, in addition to the polyurethane resin particles, of which the elastic part of the indentation work is 80% or more, the urethane resin having as a matrix polymer at least one structure of the followings A) and B) between two adjacent urethane linkages, in which remarkable rise in tackiness of the roller surface is suppressed even under a severe high-temperature and high-humidity environment, is used: A) the structure represented by the structural formula (1), and at least one structure selected from the group consisting of the structure represented by the structural formula (2) and the structure represented by the structural formula (3), and B) the structure represented by the structural formula (4).

Thus, it is expected to restore the deformation of the polyurethane resin particles on the abutting portion and improve the deterioration in toner conveying property due to toner fixation even in the case of being left to stand under a high-temperature and high-humidity environment for a long period.

The following method is usually used for synthesizing the polyurethane resin.
- one shot method in which a polyol component and a polyisocyanate component are mixed and reacted with each other, or
- a method in which an isocyanate group-terminal prepolymer obtained by reacting a part of a polyol with an isocyanate, and a chain extender such as low molecular diol or low molecular triol are allowed to react with each other.

The polyol component for forming the polyurethane matrix polymer for use in the present invention may be a prepolymer, if necessary, previously chain-extended by an isocyanate such as 2,4-tolylenediisocyanate (TDI), 1,4-diphenylmethanediisocyanate (MDI) or isophorone diisocyanate (IPDI).

The content of components other than the structure of the structural formula (1), at least one structure selected from the group consisting of the structural formulas (2) and (3), and the structure of the structural formula (4) can be 20 parts by mass or less in the polyurethane resin structure from the viewpoint of exerting the effects of the present invention.

The polyisocyanate component reacting with the polyol component is not particularly limited, and aliphatic polyisocyanates such as ethylenediisocyanate and 1,6-hexamethylene diisocyanate (HDI), alicyclic polyisocyanates such as isophorone diisocyanate (IPDI), cyclohexane-1,3-diisocyanate and cyclohexane-1,4-diisocyanate, aromatic isocyanates such as 2,4-tolylenediisocyanate, 2,6-tolylenediisocyanate (TDI), 4,4'-diphenylmethanediisocyanate (MDI), polymeric diphenylmethanediisocyanate (p-MDI), xylylenediisocyanate and naphthalenediisocyanate, and copolymers, isocyanurate compounds, TMP adduct compounds, biuret compounds and block compounds thereof can be used.

Among them, aromatic isocyanates such as tolylenediisocyanate, diphenylmethanediisocyanate and polymeric diphenylmethanediisocyanate are more suitably used.

With respect to the mixing ratio of the polyisocyanate component reacting with the polyol component, the ratio of isocyanate groups can be within a range from 1.2 to 4.0 per 1.0 of hydroxyl groups in the polyol.

A polyurethane obtained by reacting an aromatic isocyanate with a polyether component having between urethane linkages the structure of the structural formula (1) and at least one structure selected from the group consisting of the structural formulas (2) and (3), or with a polyether polyester component having between urethane linkages the structural formula (1), at least one structure selected from the structural formulas (2) and (3), and the structure of the structural formula (4) is excellent in flexibility and intensity, low in tackiness under high-temperature and high-humidity, and hardly has an increased crystallinity under a low temperature. Since the polyurethane thus obtained has a sufficiently low Tg, the polyurethane is hardly affected by a variation in environment and stably outputs a uniform image, and therefore is suitable.

Both the Tg of the polyurethane matrix polymer contained in the surface layer of the present invention and the Tg of the polyurethane resin particles contained in the surface layer of the present invention can be −50° C. or lower, and the difference between these Tg values can be 10° C. or lower. The reason for this is because the Tg of −50° C. or lower allows an overall alteration in the elastic modulus of the surface layer according to an environment to be smaller, and an output image is expected to be a stably uniform image not only in the case of being output under a high-temperature environment but also in the case of being output under a low-temperature environment.

If the difference between the Tg values of the polyurethane matrix polymer and the Tg of the polyurethane resin particles is 10° C. or lower, both the polymer and the particles are expected to have the same level of flexibility. Therefore, the polyurethane matrix polymer contained in the surface layer can less inhibit the shape of the polyurethane resin particles contained in the surface layer from being restored even under a severe low-temperature environment. Furthermore, interfacial peeling between the polyurethane matrix polymer and the polyurethane resin particles can also be suppressed.

The surface layer can have conductivity. A conductivity imparting method includes the addition of an ion conducting agent or conductive fine particles. Conductive fine particles which are inexpensive and whose resistance is less varied by an environment can be suitably used, and carbon black can be particularly used from the viewpoints of conductivity imparting property and reinforcing property. In terms of properties of the conductive fine particles, carbon black whose primary particle diameter is 18 nm or more and 50 nm or less and whose DBP oil absorption amount is 50 ml/100 g or more and 160 ml/100 g or less can be used because of having a favorable balance among conductivity, hardness and dispensability.

The above carbon black specifically includes the following: conductive carbon blacks such as "Ketjenblack" (trade name, produced by Lion Corporation) and acetylene black; and carbon blacks for rubbers, such as SAF, ISAF, HAF, FEF, GPF, SRF, FT and MT. In addition to these carbon blacks, carbon black for color inks, subjected to an oxidization treatment, and pyrolytic carbon black can be used. These carbon blacks can be used singly or can be used in combination of two or more thereof. The content of carbon black added to the surface layer can be 10 parts by mass or more and 30 parts by mass or less based on 100 parts by mass of the resin component for forming the surface layer.

A usable conducting agent other than the above carbon blacks includes the following: natural or artificial graphite; powders of metals such as copper, nickel, iron and aluminum; powders of metal oxides such as titanium oxide, zinc oxide and tin oxide; and conductive polymers such as polyaniline, polypyrrole and polyacetylene. These conducting agents can be used singly or can be used in combination of two or more thereof if necessary.

The polyurethane resin of the present invention can contain between two urethane linkages polypropylene glycol or an aliphatic polyester, if necessary, in addition to the structure of the structural formula (1), and at least one structure selected from the group consisting of the structural formulas (2) and (3) or the structure of the structural formula (4), as long as the effects of the present invention are not impaired. The aliphatic polyester includes an aliphatic polyester polyol obtained by a condensation reaction of a diol component such as 1,4-butanediol or neopentyl glycol, or a triol component such as trimethylolpropane with a dicarboxylic acid such as adipic acid, glutaric acid or sebacic acid.

The surface layer 4 can contain a crosslinking agent, a plasticizer, a filler, an extender, a vulcanizing agent, a vulcanizing aid, a crosslinking aid, an antioxidant, an anti-aging agent, a processing aid or a leveling agent as long as the effects of the present invention are not impaired.

The thickness of the surface layer 4 can be within a range from 1 to 100 μm.

A method for forming the surface layer 4 includes spray, dip, and roll coating by a coating material, and dip coating, namely, a method of allowing a coating material to overflow from the top end of a dipping tank, described in Japanese Patent Application Laid-Open No. 557-5047, is simple and excellent in production stability as a method for forming a polymeric resin layer, and is generally utilized.

Figure 4:
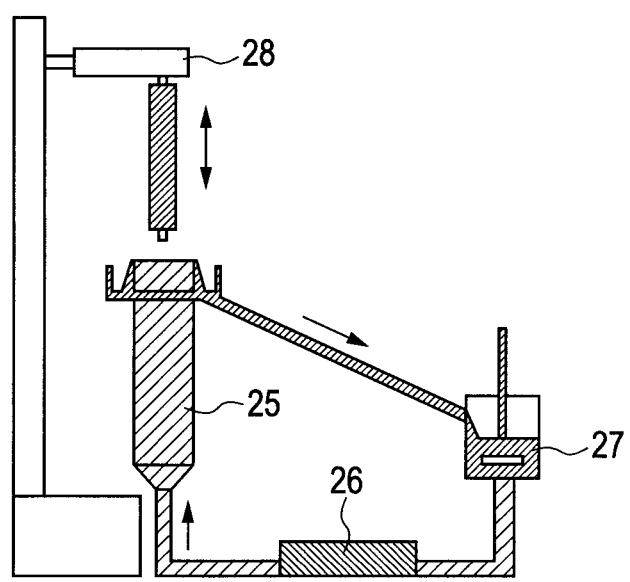
FIG. 4 is a conceptual view illustrating one example of a liquid circulation type dip coating apparatus.

FIG. 4 is a schematic view of a dip coating apparatus. Reference numeral 25 denotes a cylindrical shaped dipping tank, which has a slightly larger inner diameter than the outside diameter of the developing roller and a greater depth than the length in the axial direction of the developing roller. An annular liquid receiving portion is provided on the outer circumference of the upper edge of the dipping tank 25 and connected to a stirring tank 27. The bottom portion of the dipping tank 25 is connected to the stirring tank 27. The coating material in the stirring tank 27 is delivered to the bottom portion of the dipping tank 25 by a liquid delivery pump 26. The coating material overflows from the upper end of the dipping tank, and is returned to the stirring tank 27 via the liquid receiving portion on the outer circumference of the upper edge of the dipping tank 25. A core member 2 provided with an elastic layer 3 is perpendicularly secured to a lifting and lowering apparatus 28, and dipped in the dipping tank 25 and pulled up, thereby forming a surface layer 4.

The developing roller of the present invention can be applied to any of a noncontact-type developing apparatus and a contact-type developing apparatus using a magnetic one-component developer and a non-magnetic one-component developer, a developing apparatus using a two-component developer, and the like.

The electrophotographic process cartridge of the present invention is provided with an electrophotographic drum arranged abutting to the developing roller which is the developing member of the present invention, and is removably configured to a main body of the electrophotographic image forming apparatus. The electrophotographic image forming apparatus of the present invention is provided with an electrophotographic drum arranged abutting to the developing roller of the present invention. The electrophotographic process cartridge and the electrophotographic image forming apparatus of the present invention are not limited to a copier, a fax machine or a printer, as long as having the developing roller of the above present invention.

Figure 2:
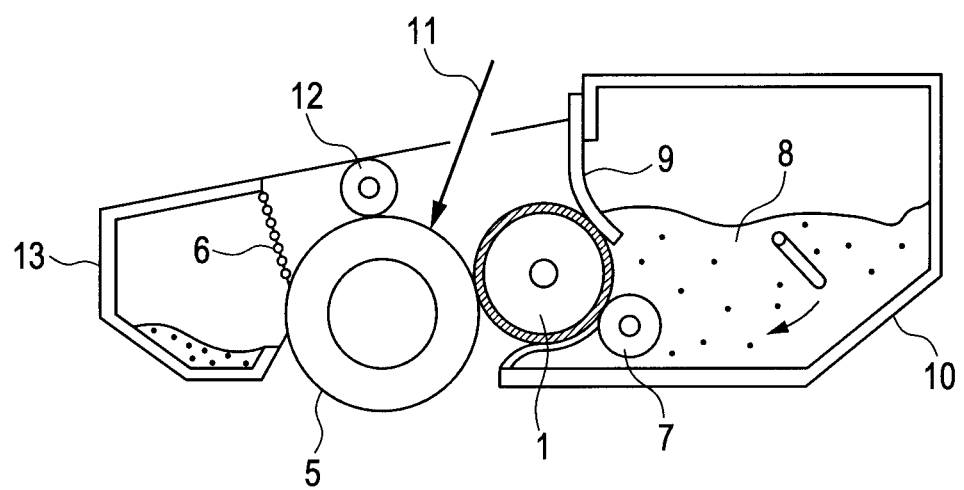
FIG. 2 is a schematic configuration view illustrating one example of an electrophotographic process cartridge of the present invention.

One example of the electrophotographic process cartridge and the electrophotographic image forming apparatus of the present invention on which the developing roller according to the present invention is mounted will be described below as a printer using a non-magnetic one-component developing process. In FIG. 2, a developing apparatus 10 is provided with a developing container which accommodates a non-magnetic toner 8 as a one-component toner, and a developing roller 1 positioned at an opening extending in the longitudinal direction of the developing container and installed opposite to the drum 5, and forms a toner image by developing an electrostatic latent image on the drum.

Figure 3:
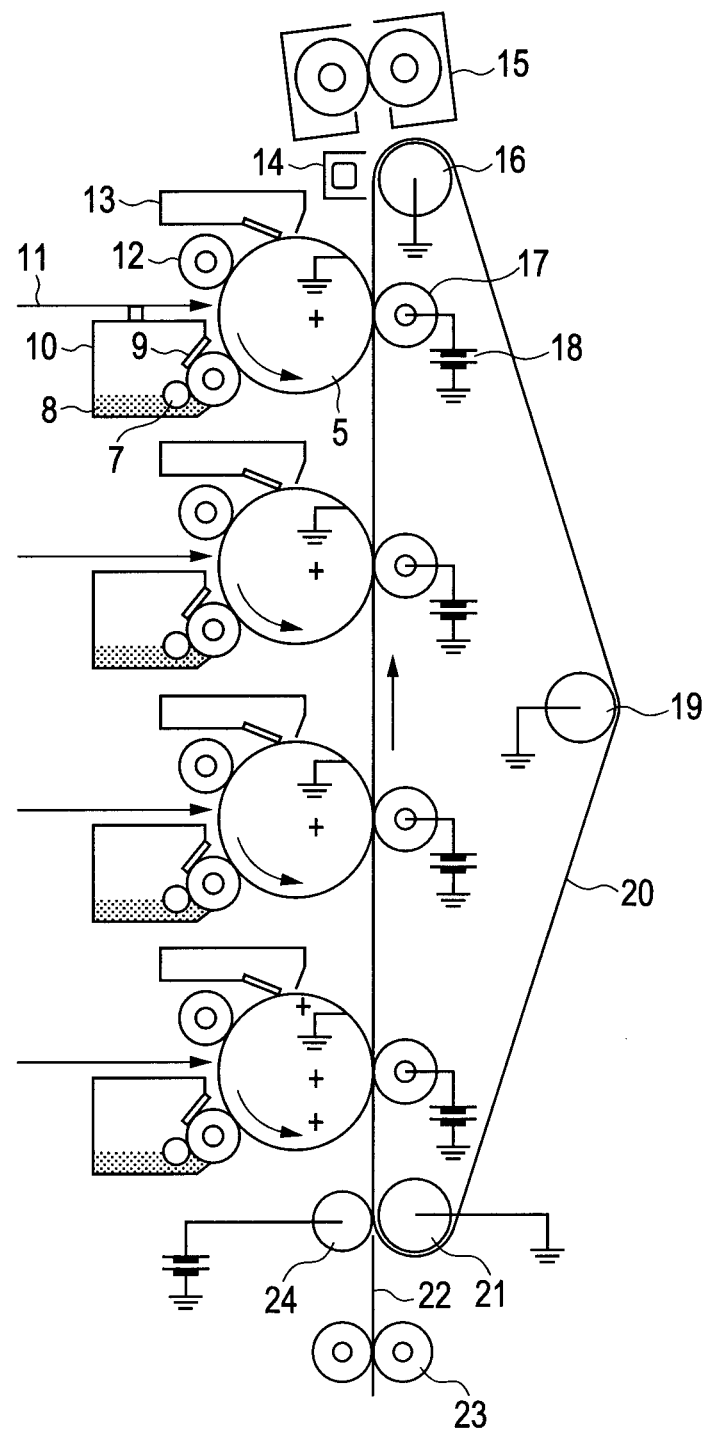
FIG. 3 is a schematic configuration view illustrating one example of an electrophotographic image forming apparatus of the present invention.

As illustrated in FIG. 3, a printer is provided with a drum 5 which is rotated by a rotating mechanism (not illustrated). A charging member 12 for charging the surface of the drum 5 to predetermined polarity and potential, and an image exposure apparatus (not illustrated) for image-exposing the surface of the charged drum 5 to form an electrostatic latent image are arranged around the drum 5. A developing apparatus 10 having a developing roller 1 of the present invention for allowing a toner to be adhered on the formed electrostatic latent image for developing is also arranged around the drum 5. An apparatus 13 for transferring a toner image to paper 22 and then cleaning the drum is further provided.

A fixing apparatus 15 for fixing the transferred toner image on the paper 22 is arranged on the route for conveying the paper 22.

EXAMPLES

Hereinafter, specific Examples and Comparative Examples according to the present invention will be described.

Molecular Weight Measurement of Copolymer

Apparatuses and conditions used for measuring a number average molecular weight (Mn) and a weight average molecular weight (Mw) in the Example section are as follows.

Measuring instrument: HLC-8120GPC (produced by Tosoh Corporation)
    Column: TSKgel SuperHZMM (produced by Tosoh Corporation)×2
    Solvent: THF (20 mmol/L triethylamine added)
    Temperature: 40° C.
    Flow speed of THF: 0.6 ml/min Herein, a measuring sample was a 0.1% by mass THF solution. An RI (refractive index) detector was used as a detector and the measurement was carried out.

TSK standard polystyrenes A-1000, A-2500, A-5000, F-1, F-2, F-4, F-10, F-20, F-40, F-80 and F-128 (produced by Tosoh Corporation) were used as standard specimens for creating a calibration curve, thereby creating a calibration curve. The weight average molecular weight was determined from the retention time of the measuring sample obtained based on the calibration curve.

Measurement of Elastic Part of Indentation Work of Urethane Resin Particle

The elastic part of the indentation work of the prepared polyurethane resin particle was measured as follows.

Namely, a nano indentation hardness tester (trade name: ENT-1100a, produced by Elionix Inc.) was used to measure the elastic part of the indentation work based on ISO 14577-1 under the following conditions: the temperature was 23±5° C., the relative humidity was less than 50% RH, the loading time and the unloading time were each 30 seconds, the retention time at the maximum load was 30 seconds, and the indentation speed was 2 μm/s or less. Herein, the maximum load was 0.1 mN.

The value of the elastic part of the indentation work of polyurethane resin particle according to each of C-1 to C-8 described later is the arithmetic mean value of the elastic part of the indentation work obtained by subjecting ten polyurethane resin particles according to each of C-1 to C-8 described later to the above measurement. Herein, as the indenter, a diamond indenter having a triangular pyramid shape at the bottom portion and an angle between adjacent edge lines of 115 degrees was used.

Tg Measurement of Polyurethane Resin Particles and Polyurethane Matrix Polymer

The Tg of the polyurethane resin particles and the Tg of the polyurethane matrix polymer were measured by using a differential scanning calorimeter DSC8230L (trade name, produced by Rigaku Corporation), and the midpoint of the temperature range in which glass transition occurs was defined as Tg.

Preparation of Mandrel

As the mandrel, a mandrel, in which a cored bar made of SUS304 having a diameter of 6 mm was coated with a primer (trade name, DY35-051; produced by Dow Corning Toray Co., Ltd.) and baked, was prepared.

Preparation of Elastic Layer

The above prepared mandrel was arranged in a mold, and an addition-type silicone rubber composition containing the following materials mixed was poured into a cavity formed in the mold.

TABLE 1

| | |
|---|---|
| Liquid silicone rubber material, trade name, SE6724A/B; produced by Dow Corning Toray Co., Ltd. | 100 parts by mass |
| Carbon black, trade name, TOKABLACK #4300, Tokai Carbon Co., Ltd. | 15 parts by mass |
| Silica powder as heat resistance imparting agent | 0.2 parts by mass |
| Platinum catalyst | 0.1 parts by mass |

Subsequently, the mold was heated to vulcanization-cure a silicone rubber at 150° C. for 15 minutes and released, followed by completing the curing reaction by additional heating at 180° C. for 1 hour, thereby providing an elastic layer having a diameter of 12 mm on the outer circumference of the mandrel.

Preparation of Surface Layer

Synthetic examples for obtaining a surface layer are described below.

(Polyether Diol A-1)

A mixture of 230.7 g (3.2 mol) of dry tetrahydrofuran and 68.9 g (0.8 mol) of dry 3-methyltetrahydrofuran (molar mixing ratio 80/20) was held in a reaction vessel to a temperature of 10° C. Perchloric acid (70%, 13.1 g) and 120 g of acetic anhydride were added thereto and allowed to react for 2.5 hours. Then, the reaction mixture was poured into 600 g of a 20% aqueous sodium hydroxide solution, and purified. The remaining water and solvent component were removed under reduced pressure to obtain 218 g of a liquid polyether diol A-1. The number average molecular weight was 2000.

(Synthesis of Hydroxyl Group-Terminal Urethane Prepolymer A-2)

Under a nitrogen atmosphere, 28.4 parts by mass of COSMONATE MDI (trade name, produced by Mitsui Chemicals Inc.) was dissolved in 50.0 parts by mass of methyl ethyl ketone in a reaction vessel. Then, a solution of 200.0 g of the polyether diol A-1 in 178.4 parts by mass of methyl ethyl ketone was gradually dropped thereto while holding the temperature in the reaction vessel to 65° C. After the completion of dropping, the reaction was carried out at a temperature of 75° C. for 3 hours. The obtained reaction mixture was cooled to room temperature to obtain 221 g of a hydroxyl group-terminal urethane prepolymer A-2. The number average molecular weight was 15000.

(Polyether Polyester Diol A-3)

A mixture of the polyether diol A-1 and Kuraray Polyol P-2010 (trade name, produced by Kuraray Co., Ltd.) (mass ratio: 50/50) was used as a polyether polyester diol A-3.

(Polyester Diol A-4)

Kuraray Polyol P-2010 was used.

(Polyether Diol A-5)

PTG 2000 (trade name, produced by Hodogaya Chemical Co., Ltd.) was used.

(Synthesis of Polyether Diol A-6)

Dry 3-methyltetrahydrofuran (172.2 g, 4 mol) was held to a temperature of 10° C. in a reaction vessel. Perchloric acid (70%, 13.1 g) and 120 g of acetic anhydride were added thereto and allowed to react for 2.5 hours. Then, the reaction mixture was poured into 600 g of a 20% aqueous sodium hydroxide solution, and purified. The remaining water and solvent component were removed under reduced pressure to obtain 152 g of a liquid polyether diol A-6. The number average molecular weight was 2000.

(Synthesis of Polyester Diol A-7)

Dry butanediol (90.1 g, 1 mol) and 146.1 g (1 mol) of dry adipic acid were held to a temperature of 200° C. in a reaction vessel, and stirred for 1 hour. Then, the remaining water and solvent component were removed under reduced pressure to obtain 176 g of a liquid polyester diol A-7. The number average molecular weight was 2000.

(Isocyanate Group-Terminal Prepolymer B-1)

Coronate 2030 (trade name, produced by Nippon Polyurethane Industry Co., Ltd.) was used.

(Synthesis of Isocyanate Group-Terminal Prepolymer B-2)

Under a nitrogen atmosphere, 200.0 g of Excenol 1030 (trade name, produced by Asahi Glass Co., Ltd.) being a polypropylene glycol-based polyol was gradually dropped to 69.6 parts by mass of COSMONATE 80 (trade name, produced by Mitsui Chemicals Inc.) being tolylenediisocyanate (TDI) in a reaction vessel while holding the temperature in the reaction vessel to 65° C. After the completion of dropping, the reaction was carried out at a temperature of 65° C. for 2 hours. The obtained reaction mixture was cooled to room temperature to obtain 244 g of an isocyanate group-terminal urethane prepolymer B-2 in which the content of isocyanate groups was 4.8%.

(Polyurethane Resin Particles C-1)

Art Pearl P-800T (trade name, produced by Negami Chemical Industrial Co., Ltd.) was used. In the polyurethane resin particles, the average particle diameter was 7 µm, the Tg was −32° C., and the elastic part of the indentation work was 80%.

(Polyurethane Resin Particles C-2)

DAIMICBEAZ UCN-5070D (trade name, produced by Dainichiseika Color & Chemicals Mfg. Co., Ltd.) was used. In the polyurethane resin particles, the average particle diameter was 7 µm, the Tg was −10° C., and the elastic part of the indentation work was 93%.

(Polyurethane Resin Particles C-3)

DAIMICBEAZ UCN-5150D (trade name, produced by Dainichiseika Color & Chemicals Mfg. Co., Ltd.) was used. In polyurethane resin particles, the average particle diameter was 15 µm, the Tg was −10° C., and the elastic part of the indentation work was 87%.

(Polyurethane Resin Particles C-4)

Art Pearl C-800T (trade name, produced by Negami Chemical Industrial Co., Ltd.) was used. In the polyurethane resin particles, the average particle diameter was 7 µm, the Tg was −13° C., and the elastic part of the indentation work was 56%.

(Synthesis of Polyurethane Resin Particles C-5)

Placcel 320 (trade name, produced by Daicel Corporation) (208.0 g) being a trifunctional polycaprolactone-based polyester polyol, 92.0 g of a uretdione-type polyisocyanate of hexamethylene diisocyanate (Index (NCO/OH): 1.5), 100 g of methyl ethyl ketone, and 0.003 g of dibutyltin dilaurate were mixed in a reaction vessel.

Then, 800 g of water was added in a separable flask equipped with a stirrer and 32 g of Metolose 90SH-100 (trade name, produced by Shin-Etsu Chemical Co., Ltd.) being hydroxypropyl methylcellulose was dissolved therein, thereby preparing a dispersion medium. The reaction system in the reaction vessel was added while stirring at 600 rpm to prepare a suspension, and then heated to a temperature of 60° C. and stirred in the state for additional 4 hours. The obtained reaction mixture was cooled to room temperature, washed with water, and then dried to obtain polyurethane resin particles having an average particle diameter of 10 µm. The Tg was −48° C. The elastic part of the indentation work was 86%.

(Synthesis of Polyurethane Resin Particles C-6)

Art Pearl JB-800T (trade name, produced by Negami Chemical Industrial Co., Ltd.) was used. In the polyurethane resin particles, the average particle diameter was 7 µm, the Tg was −52° C., and the elastic part of the indentation work was 91%.

(Synthesis of Polyurethane Resin Particles C-7)

Kuraray Polyol P-6010 (trade name, produced by Kuraray Co., Ltd.) (1420 g), 80 g of hexamethylene diisocyanate, and 0.15 g of dibutyltin dilaurate were added in an autoclave sufficiently filled with nitrogen gas, and stirred at 60° C. for 12 hours, thereby obtaining a reaction mixture 1.

Placcel 320 (1200 g) and 300 g of hexamethylene diisocyanate were mixed in another reaction vessel to obtain a reaction mixture 2.

Then, the above reaction mixture 1, the reaction mixture 2, and 31.0 g of a uretdione-type polyisocyanate of hexamethylene diisocyanate were mixed to obtain a reaction mixture 3.

Furthermore, 800 g of water was added in a separable flask equipped with a stirrer, and 32 g of Metolose 90SH-100 was dissolved therein to prepare a dispersion medium. The reaction mixture 3 was added thereto while stirring at 600 rpm to prepare a suspension, and then heated to a temperature of 60° C. and stirred in the state for additional 4 hours. The obtained reaction mixture was cooled to room temperature, washed with water, and then dried to obtain polyurethane resin particles having an average particle diameter of 10 µm. The Tg was −58° C. The elastic part of the indentation work was 89%.

(Synthesis of Polyurethane Resin Particles C-8)

Polyurethane resin particles having an average particle diameter of 10 µm were obtained in the same manner as in C-7 except that 160 g of Kuraray Polyol P-6050 (trade name, number average molecular weight: 6000, produced by Kuraray Co., Ltd.) being a copolymer of 3-methyl pentanediol and sebacic acid was used as a polyester polyol in C-7. The Tg was −62° C. The elastic part of the indentation work was 92%.

Example 1

Hereinafter, a method for producing the developing roller of the invention of the present application will be described.

The isocyanate group-terminal prepolymer B-1 (109 parts by mass based on 100 parts by mass of the polyol A-1), and 30 parts by mass of carbon black MA 230 (trade name, produced by Mitsubishi Chemicals Corporation) relative to a resin component were mixed, dissolved in methyl ethyl ketone and mixed, and uniformly dispersed by a sand mill to obtain a dispersion 1.

Herein, in order to measure Tg, a small amount of the dispersion 1 was spread to a ceramic plate, heat-treated at 150° C. for 2 hours to thereby prepare a test piece of a polyurethane matrix polymer, and subjected to the measurement of Tg. The Tg was −61° C.

The polyurethane resin particles C-1 (100 parts by mass relative to a resin component) as the resin particles was added to the above dispersion 1 and stirred by a stirring motor for 10 minutes to obtain a surface layer forming coating material 1.

Then, the surface layer forming coating material 1 was dip coated on the above elastic layer 3 and then dried, and heat-treated at 150° C. for 1 hour to thereby provide a surface layer 4 on the outer circumference of the elastic layer, thereby obtaining a developing roller of Example 1. The thickness of the surface layer was 8.2 µm.

Example 2

The isocyanate group-terminal prepolymer B-1 (19 parts by mass based on 100 parts by mass of the polyol A-2), and 30 parts by mass of carbon black MA 230 (trade name, produced by Mitsubishi Chemicals Corporation) relative to a resin component were mixed, dissolved in methyl ethyl ketone and mixed so that the total solid content proportion was 30% by mass, and uniformly dispersed by a sand mill to obtain a dispersion 2.

Herein, in order to measure Tg, a small amount of the dispersion 2 was spread to a ceramic plate, heat-treated at 150° C. for 2 hours to thereby prepare a test piece of a polyurethane matrix polymer, and subjected to the measurement of Tg. The Tg was −58° C.

The polyurethane resin particles C-1 (100 parts by mass relative to a resin component) as the resin particles was added to the above dispersion 2 and stirred by a stirring motor for 10 minutes to obtain a surface layer forming coating material 2.

Then, the surface layer forming coating material 2 was dip coated on the above elastic layer 3 and then dried, and heat-treated at 150° C. for 2 hours to thereby provide a surface layer 4 on the outer circumference of the elastic layer, thereby obtaining a developing roller of Example 2. The thickness of the surface layer was 8.8 µm.

Example 3

The isocyanate group-terminal prepolymer B-1 (108 parts by mass based on 100 parts by mass of the polyol A-3), and 30 parts by mass of carbon black MA 230 (trade name, produced by Mitsubishi Chemicals Corporation) relative to a resin component were mixed, dissolved in methyl ethyl ketone and mixed, and uniformly dispersed by a sand mill to obtain a dispersion 3.

Herein, in order to measure Tg, a small amount of the dispersion 3 was spread to a ceramic plate, heat-treated at 150° C. for 2 hours to thereby prepare a test piece of a polyurethane matrix polymer, and subjected to the measurement of Tg. The Tg was −54° C.

The polyurethane resin particles C-1 (100 parts by mass relative to a resin component) as the resin particles was added to the above dispersion 3 and stirred by a stirring motor for 10 minutes to obtain a surface layer forming coating material 3.

Then, the surface layer forming coating material 2 was dip coated on the above elastic layer 3 and then dried, and heat-treated at 150° C. for 2 hours to thereby provide a surface layer 4 on the outer circumference of the elastic layer, thereby obtaining a developing roller of Example 3. The thickness of the surface layer was 9.2 µm.

Example 4

The isocyanate group-terminal prepolymer B-2 (120 parts by mass based on 100 parts by mass of the polyol A-2), and 30 parts by mass of carbon black MA 230 (trade name, produced by Mitsubishi Chemicals Corporation) relative to a resin component were mixed, dissolved in methyl ethyl ketone and mixed, and uniformly dispersed by a sand mill to obtain a dispersion 4.

Herein, in order to measure Tg, a small amount of the dispersion 4 was spread to a ceramic plate, heat-treated at 150° C. for 2 hours to thereby prepare a test piece of a polyurethane matrix polymer, and subjected to the measurement of Tg. The Tg was −53° C.

The polyurethane resin particles C-1 (100 parts by mass relative to a resin component) as the resin particles was added to the above dispersion 4 and stirred by a stirring motor for 10 minutes to obtain a surface layer forming coating material 4.

Then, the surface layer forming coating material 4 was dip coated on the above elastic layer 3 and then dried, and heat-treated at 150° C. for 2 hours to thereby provide a surface layer 4 on the outer circumference of the elastic layer, thereby obtaining a developing roller of Example 4. The thickness of the surface layer was 8.5 µm.

Example 5

The isocyanate group-terminal prepolymer B-1 (107 parts by mass based on 100 parts by mass of the polyol A-4), and 30 parts by mass of carbon black MA 230 (trade name, produced by Mitsubishi Chemicals Corporation) relative to a resin component were mixed, dissolved in methyl ethyl ketone and mixed, and uniformly dispersed by a sand mill to obtain a dispersion 5.

Herein, in order to measure Tg, a small amount of the dispersion 5 was spread to a ceramic plate, heat-treated at 150° C. for 2 hours to thereby prepare a test piece of a polyurethane matrix polymer, and subjected to the measurement of Tg. The Tg was −46° C.

The polyurethane resin particles C-1 (100 parts by mass relative to a resin component) as the resin particles was added to the above dispersion 5 and stirred by a stirring motor for 10 minutes to obtain a surface layer forming coating material 5.

Then, the surface layer forming coating material 5 was dip coated on the above elastic layer 3 and then dried, and heat-treated at 150° C. for 2 hours to thereby provide a surface layer 4 on the outer circumference of the elastic layer, thereby obtaining a developing roller of Example 5. The thickness of the surface layer was 9.8 µm.

Example 11

A developing roller of Example 11 was obtained in the same manner as in Example 1 except that 50 parts by mass of the polyurethane resin particles C-3 as the resin particles were added to a resin component.

Example 12

A developing roller of Example 12 was obtained in the same manner as in Example 2 except that 50 parts by mass of the polyurethane resin particles C-3 as the resin particles were added to a resin component.

Example 13

A developing roller of Example 13 was obtained in the same manner as in Example 3 except that as a material for the surface layer 4, 20 parts by mass of the polyurethane resin particles C-3 as the resin particles were added to a resin component.

Example 14

A developing roller of Example 14 was obtained in the same manner as in Example 4 except that as a material for the surface layer 4, 50 parts by mass of the polyurethane resin particles C-3 as the resin particles were added to a resin component.

Example 15

A developing roller of Example 15 was obtained in the same manner as in Example 5 except that as a material for the surface layer 4, 50 parts by mass of the polyurethane resin particles C-3 as the resin particles were added to a resin component.

Examples 6 to 10 and Examples 16 to 35

Developing rollers of Examples 6 to 10 and Examples 16 to 35 were obtained using the same method as in Examples 1 to 5 by adding polyurethane resin particles shown in the following Table 2-1 and Table 2-2.

Table 2-1 and Table 2-2 show polyol No. and a chemical structure contained in the polyol, and isocyanate No. and a chemical structure contained in the isocyanate, the polyol and the isocyanate being used for raw materials of the polyurethane resin as the matrix polymer in the surface layer of each of the developing rollers according to Examples 1 to 35, and also show the Tg of the polyurethane resin. Table 2-1 and Table 2-2 also show the No., the particle diameter, and the value of the elastic part of the indentation work of the polyurethane resin particle in the surface layer.

TABLE 2-1

| | Polyurethane matrix polymer | | | | | Polyurethane resin particle | | | |
| | Polyol | | Isocyanate | | | | | | |
| Example | No. | Chemical structure contained | No. | Chemical structure contained | Tg [° C.] | No. | Particle diameter [μm] | Elastic part of indentation work [%] | Tg [° C.] |
|---|---|---|---|---|---|---|---|---|---|
| 1 | A-1 | Structural formula (1) + (2 or 3) | B-1 | MDI | −61 | C-1 | 7 | 80 | −32 |
| 2 | A-2 | Structural formula (1) + (2 or 3) + MDI | | | −58 | | | | |
| 3 | A-3 | Structural formula (1) + (2 or 3) + (4) | | | −54 | | | | |
| 4 | A-2 | Structural formula (1) + (2 or 3) + MDI | B-2 | TDI | −53 | | | | |
| 5 | A-4 | Structural formula (4) | B-1 | MDI | −46 | | | | |
| 6 | A-1 | Structural formula (1) + (2 or 3) | B-1 | MDI | −61 | C-2 | 7 | 93 | −10 |
| 7 | A-2 | Structural formula (1) + (2 or 3) + MDI | | | −58 | | | | |
| 8 | A-3 | Structural formula (1) + (2 or 3) + (4) | | | −54 | | | | |
| 9 | A-2 | Structural formula (1) + (2 or 3) + MDI | B-2 | TDI | −53 | | | | |
| 10 | A-4 | Structural formula (4) | B-1 | MDI | −46 | | | | |
| 11 | A-1 | Structural formula (1) + (2 or 3) | B-1 | MDI | −61 | C-3 | 15 | 87 | −10 |
| 12 | A-2 | Structural formula (1) + (2 or 3) + MDI | | | −58 | | | | |
| 13 | A-3 | Structural formula (1) + (2 or 3) + (4) | | | −54 | | | | |
| 14 | A-2 | Structural formula (1) + (2 or 3) + MDI | B-2 | TDI | −53 | | | | |
| 15 | A-4 | Structural formula (4) | B-1 | MDI | −46 | | | | |
| 16 | A-1 | Structural formula (1) + (2 or 3) | B-1 | MDI | −61 | C-5 | 10 | 86 | −48 |
| 17 | A-2 | Structural formula (1) + (2 or 3) + MDI | | | −58 | | | | |
| 18 | A-3 | Structural formula (1) + (2 or 3) + (4) | | | −54 | | | | |
| 19 | A-2 | Structural formula (1) + (2 or 3) + MDI | B-2 | TDI | −53 | | | | |
| 20 | A-4 | Structural formula (4) | B-1 | MDI | −46 | | | | |

TABLE 2-2

| | Polyurethane matrix polymer | | | | | Polyurethane resin particle | | | |
| | Polyol | | Isocyanate | | | | | | |
| Example | No. | Chemical structure contained | No. | Chemical structure contained | Tg [° C.] | No. | Particle diameter [μm] | Elastic part of indentation work [%] | Tg [° C.] |
|---|---|---|---|---|---|---|---|---|---|
| 21 | A-1 | Structural formula (1) + (2 or 3) | B-1 | MDI | −61 | C-6 | 10 | 91 | −52 |
| 22 | A-2 | Structural formula (1) + (2 or 3) + MDI | | | −58 | | | | |
| 23 | A-3 | Structural formula (1) + (2 or 3) + (4) | | | −54 | | | | |
| 24 | A-2 | Structural formula (1) + (2 or 3) + MDI | B-2 | TDI | −53 | | | | |
| 25 | A-4 | Structural formula (4) | B-1 | MDI | −46 | | | | |
| 26 | A-1 | Structural formula (1) + (2 or 3) | B-1 | MDI | −61 | C-7 | 10 | 89 | −58 |
| 27 | A-2 | Structural formula (1) + (2 or 3) + MDI | | | −58 | | | | |
| 28 | A-3 | Structural formula (1) + (2 or 3) + (4) | | | −54 | | | | |
| 29 | A-2 | Structural formula (1) + (2 or 3) + MDI | B-2 | TDI | −53 | | | | |
| 30 | A-4 | Structural formula (4) | B-1 | MDI | −46 | | | | |
| 31 | A-1 | Structural formula (1) + (2 or 3) | B-1 | MDI | −61 | C-8 | 10 | 92 | −62 |
| 32 | A-2 | Structural formula (1) + (2 or 3) + MDI | | | −58 | | | | |
| 33 | A-3 | Structural formula (1) + (2 or 3) + (4) | | | −54 | | | | |
| 34 | A-2 | Structural formula (1) + (2 or 3) + MDI | B-2 | TDI | −53 | | | | |
| 35 | A-4 | Structural formula (4) | B-1 | MDI | −46 | | | | |

Comparative Example 1

A developing roller of Comparative Example 1 was obtained in the same manner as in Example 1 except that the polyurethane resin particles were changed to C-4.

Comparative Example 2

A developing roller of Comparative Example 2 was obtained in the same manner as in Example 2 except that the polyurethane resin particles were changed to C-4.

Comparative Example 3

A developing roller of Comparative Example 3 was obtained in the same manner as in Example 3 except that the polyurethane resin particles were changed to C-4.

Comparative Example 4

A developing roller of Comparative Example 4 was obtained in the same manner as in Example 4 except that the polyurethane resin particles were changed to C-4.

Comparative Example 5

A developing roller of Comparative Example 5 was obtained in the same manner as in Example 5 except that the polyurethane resin particles were changed to C-4.

Comparative Example 6

A developing roller of Comparative Example 6 was obtained in the same manner as in Example 1 except that the polyol was changed to A-5 and the polyurethane resin particles were changed to C-2. Herein, the Tg of a test piece of a polyurethane matrix polymer prepared by the same method as in Example 1 was −31° C.

Comparative Example 7

A developing roller of Comparative Example 7 was obtained in the same manner as in Example 1 except that the polyol was changed to A-6 and the polyurethane resin particles were changed to C-2. Herein, the Tg of a test piece of a polyurethane matrix polymer prepared by the same method as in Example 1 was −29° C.

Comparative Example 8

A developing roller of Comparative Example 8 was obtained in the same manner as in Example 1 except that the polyol was changed to A-7 and the polyurethane resin particles were changed to C-2. Herein, the Tg of a test piece of a polyurethane matrix polymer prepared by the same method as in Example 1 was −40° C. The polyurethane matrix polymer of Comparative Example 8 contains a structure represented below.

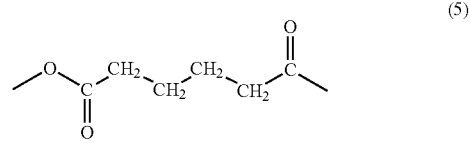

(5)

Table 3 shows polyol No. and a chemical structure contained in the polyol, and isocyanate No. and a chemical structure contained in the isocyanate, the polyol and the isocyanate being used for raw materials of the polyurethane resin as the matrix polymer in the surface layer of each of the developing rollers according to Comparative Examples 1 to 8, and also shows the Tg of the polyurethane resin. Table 3 also shows the No., the particle diameter, and the value of the elastic part of the indentation work of the polyurethane resin particle in the surface layer.

TABLE 3

| | Polyurethane matrix polymer | | | | | Polyurethane resin particle | | |
| | Polyol | | Isocyanate | | | | | |
| Comparative Example | No. | Chemical structure contained | No. | Chemical structure contained | Tg [° C.] | No. | Particle diameter [μm] | Elastic part of indentation work [%] | Tg [° C.] |
|---|---|---|---|---|---|---|---|---|---|
| 1 | A-1 | Structural formula (1) +(2 or 3) | B-1 | MDI | −61 | C-4 | 7 | 56 | −13 |
| 2 | A-2 | Structural formula (1) + (2 or 3) + MDI | | | −58 | | | | |
| 3 | A-3 | Structural formula (1) + (2 or 3) + (4) | | | −54 | | | | |
| 4 | A-2 | Structural formula (1) + (2 or 3) + MDI | B-2 | TDI | −53 | | | | |
| 5 | A-4 | Structural formula (4) | B-1 | MDI | −46 | | | | |
| 6 | A-5 | Structural formula (1) | | | −31 | C-2 | 7 | 93 | −10 |
| 7 | A-6 | Structural formula (2 or 3) | | | −29 | | | | |
| 8 | A-7 | Structural formula (1) + (5) | | | −40 | | | | |

Image Evaluation and Surface Roughness (Ra) Evaluation of Developing Roller

A developing roller to be evaluated was mounted to a black process cartridge for a laser printer (trade name: LBP5300, produced by Canon Inc.) having a configuration illustrated in FIG. 4.

The process cartridge was placed under a high-temperature and high-humidity environment of an ambient temperature of 40° C. and a relative humidity of 95% RH for 30 days. Thereafter, the process cartridge was placed under an ordinary-temperature and ordinary-pressure environment of an ambient temperature 25° C. and a relative humidity of 50±5% RH for 24 hours, and subsequently placed under a low-temperature environment of an ambient temperature of 0° C. for 24 hours.

Then, the process cartridge was loaded to the above laser printer to output a halftone image under a low-temperature environment of an ambient temperature of 0° C. without pre-rotation. The halftone image was visually observed and evaluated based on the following criteria.

AA: There is no difference in image density between an abutting site against blade and other site, and the entirety was uniform.

A: Image density of a site corresponding to an abutting site against blade was slightly low only at an initial image output portion.

C: Image density of a site corresponding to an abutting site against blade was low all over an image.

The process cartridge subjected to the above image evaluation was taken out from the laser printer under a low-temperature environment of an ambient temperature of 0° C., the developing roller to be evaluated was immediately taken out from the process cartridge, and the surface of the developing roller was subjected to air blow to remove a toner on the surface. Thereafter, after the developing roller to be evaluated was left to stand under a high-temperature and high-humidity environment for 30 days, the surface roughnesses Ra (JIS B0601) of the surface site which had abutted against the regulating blade and the surface site which had not abutted against the regulating blade were measured using a surface roughness meter (trade name: Surfcom 480A, produced by Tokyo Seimitsu Co., Ltd.), and defined as the values of Ra. The measurement conditions were as follows: the radius of a sensing pin used was 2 μm, the indentation pressure was 0.7 mN, the measuring speed was 0.3 mm/sec, the measuring magnification was 5000 times, the cutoff wavelength was 0.8 mm, and the measuring length was 2.5 mm.

The foregoing results are shown in Table 4-1 and Table 4-2.

TABLE 4-1

| Example | Image evaluation | Thickness [μm] | Surface roughness (Ra) Abutting site against blade | Other site |
|---|---|---|---|---|
| 1 | A | 8.2 | 1.5 | 1.6 |
| 2 | A | 8.8 | 1.5 | 1.6 |
| 3 | A | 9.2 | 1.5 | 1.6 |
| 4 | A | 8.5 | 1.7 | 1.8 |
| 5 | A | 9.8 | 1.5 | 1.6 |
| 6 | A | 8.7 | 1.4 | 1.6 |
| 7 | A | 8.1 | 1.4 | 1.6 |
| 8 | A | 9.0 | 1.4 | 1.6 |
| 9 | A | 8.4 | 1.6 | 1.8 |
| 10 | A | 8.3 | 1.4 | 1.6 |
| 11 | A | 13.1 | 1.7 | 1.9 |
| 12 | A | 12.4 | 1.7 | 1.9 |
| 13 | A | 12.5 | 1.7 | 1.9 |
| 14 | A | 13.3 | 1.8 | 2.0 |
| 15 | A | 12.7 | 1.7 | 1.9 |
| 16 | A | 9.1 | 1.5 | 1.6 |
| 17 | A | 9.3 | 1.5 | 1.6 |
| 18 | A | 10.4 | 1.5 | 1.6 |
| 19 | A | 9.8 | 1.7 | 1.8 |
| 20 | A | 9.6 | 1.5 | 1.6 |
| 21 | AA | 9.4 | 1.6 | 1.6 |

TABLE 4-1-continued

| Example | Image evaluation | Thickness [μm] | Surface roughness (Ra) Abutting site against blade | Other site |
|---|---|---|---|---|
| 22 | AA | 9.9 | 1.6 | 1.6 |
| 23 | AA | 10.2 | 1.6 | 1.6 |
| 24 | AA | 9.8 | 1.8 | 1.8 |
| 25 | A | 9.4 | 1.5 | 1.6 |
| 26 | AA | 9.3 | 1.6 | 1.6 |
| 27 | AA | 10.3 | 1.6 | 1.6 |
| 28 | AA | 9.7 | 1.6 | 1.6 |
| 29 | AA | 9.6 | 1.8 | 1.8 |
| 30 | A | 9.1 | 1.5 | 1.6 |
| 31 | AA | 9.3 | 1.6 | 1.6 |
| 32 | AA | 10.1 | 1.6 | 1.6 |
| 33 | AA | 9.4 | 1.6 | 1.6 |
| 34 | AA | 9.9 | 1.8 | 1.8 |
| 35 | A | 10.2 | 1.5 | 1.6 |

TABLE 4-2

| Comparative Example | Image evaluation | Thickness [μm] | Surface roughness (Ra) Abutting site against blade | Other site |
|---|---|---|---|---|
| 1 | C | 10.0 | 0.8 | 1.6 |
| 2 | C | 9.1 | 0.8 | 1.6 |
| 3 | C | 9.1 | 0.8 | 1.6 |
| 4 | C | 9.3 | 0.9 | 1.8 |
| 5 | C | 10.3 | 0.8 | 1.6 |
| 6 | C | 10.2 | 0.8 | 1.6 |
| 7 | C | 9.4 | 0.8 | 1.6 |
| 8 | C | 9.3 | 0.8 | 1.6 |

With respect to Examples 1 to 35 in which the polyurethane matrix polymer of the present invention and the polyurethane resin particles were contained in the surface layer, the surface layer had a smaller difference in roller surface roughness between the abutting site against blade and the other site after being left to stand under a severe high-temperature and high-humidity environment for a long period. Furthermore, the surface layer did not have toner fixation confirmed. Therefore, there was no difference in image density, and a uniform image was obtained. This means that the polyurethane matrix polymer of the present invention was combined with the polyurethane resin particles to thereby restore the deformation of the polyurethane resin particles on the abutting portion and improve the deterioration in toner conveying property due to toner fixation after being left to stand under a high-temperature and high-humidity environment over a long period.

In particular, with respect to Example 21 to 24, to 29, and 31 to 34 in which both the Tg of the polyurethane matrix polymer and the Tg of the polyurethane resin particles were −50° C. or lower and the difference in Tg was 10° C. or lower, a uniform image was formed even in the initial image output portion. Furthermore, the roughness of the portion having abutted against the regulating blade showed substantially no significant difference as compared with the roughness of the other site than the abutting portion under a severe high-temperature and high-humidity environment. This means that the polyurethane matrix polymer of the present invention does not inhibit the deformation of the polyurethane resin particles from being restored at the abutting portion without exhibiting a remarkable crystallinity under a severe low-temperature environment, even in the case where an image was output under a low-temperature environment such as 0° C. after the polyurethane matrix polymer had been left to stand over a long period. Since the difference between the Tg values of the polyurethane matrix polymer and the Tg of the polyurethane resin particles was 10° C. or lower, it is presumed that they were equally flexible. Thus, the polyurethane matrix polymer contained in the surface layer less inhibited the shape of the polyurethane resin particles contained in the surface layer from being restored even under a severe low-temperature environment.

In contrast, with respect to Comparative Examples 1 to 5, regardless of using the polyurethane matrix polymer of the present invention, since the elastic part of the indentation work of the polyurethane resin particles was less than 80%, the topical reduction in surface roughness was not sufficiently restored after left to stand under a severe high-temperature and high-humidity environment for a long period, thereby failing to achieve a favorable effect. With respect to Comparative Examples 6 to 8, the polyurethane matrix polymer of the present invention was not used. Therefore, it is considered that even if the polyurethane resin particles whose elastic part of the indentation work was 80% or more were used, the toner conveying property was deteriorated due to the extraordinary surface roughness by toner fixation after left to stand under a severe high-temperature and high-humidity environment for a long period. Since a remarkable crystallinity was developed under a low-temperature environment to inhibit the deformation of the polyurethane resin particles from being restored at the abutting portion, the difference in roller surface roughness between the site having abutted against blade and the other site was larger to thereby fail to obtain a uniform image.

This application claims the priority from Japanese Patent Application No. 2011-156960 filed on Jul. 15, 2011, the content of which is incorporated by reference as a part of this application.

What is claimed is:

1. A developing roller comprising a mandrel, an elastic layer and a surface layer covering the surface of the elastic layer, wherein
the surface layer contains a urethane resin which has at least one structure of the followings A) and B) between two adjacent urethane linkages:
A) a structure represented by the following structural formula (1), and at least one structure selected from the group consisting of a structure represented by the following structural formula (2) and a structure represented by the following structural formula (3), and
B) a structure represented by the following structural formula (4),
and wherein
the surface layer contains polyurethane resin particles of which the elastic part of the indentation work based on ISO 14577-1 is 80% or more:

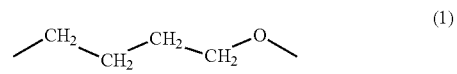

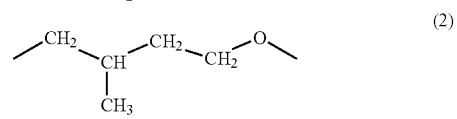

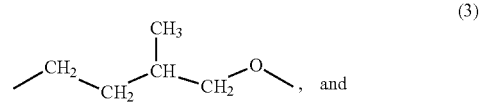

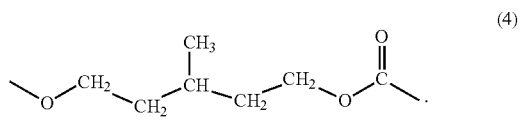

2. The developing roller according to claim 1, wherein both the Tg of the urethane resin covering the surface of the elastic layer and the Tg of the polyurethane resin particles contained in the surface layer are −50° C. or lower, and the difference between these Tg values is 10° C. or lower.

3. An electrophotographic process cartridge provided with a drum on which an electrostatic latent image is to be formed and a developing member for developing the electrostatic latent image on the drum, and being mountable to and removable from a main body of an electrophotographic image forming apparatus, wherein the developing member is the developing roller according to claim 1.

4. An electrophotographic image forming apparatus provided with a drum on which an electrostatic latent image is to be formed and a developing member for developing the electrostatic latent image on the drum, wherein the developing member is the developing roller according to claim 1.

* * * * *